No. 664,724. Patented Dec. 25, 1900.
R. W. COOMBS & L. A. BROOKS.
SELF LUBRICATING AND DUST PROOF BEARING FOR COLTERS OR OTHER SHAFTS.
(Application filed Mar. 24, 1900.)
(No Model.) 2 Sheets—Sheet 1.

Inventors
Robert W. Coombs.
Louis A. Brooks.

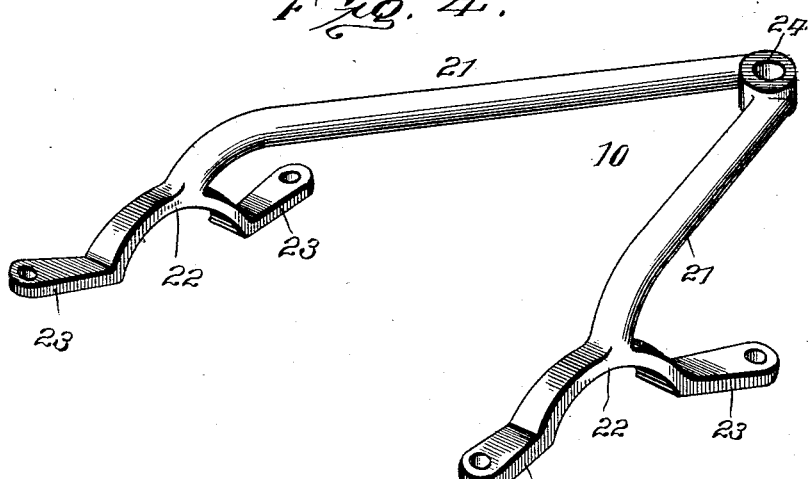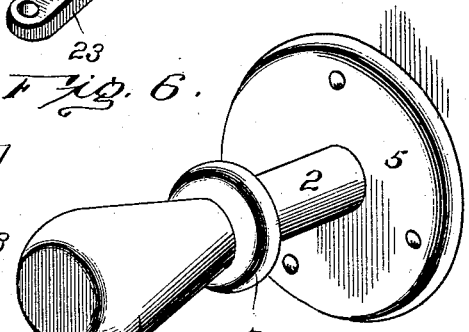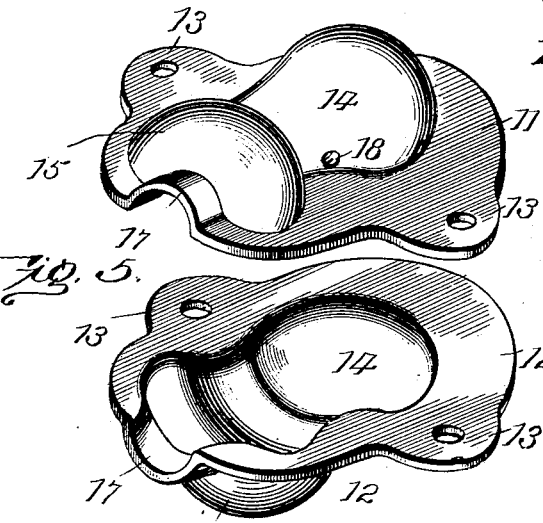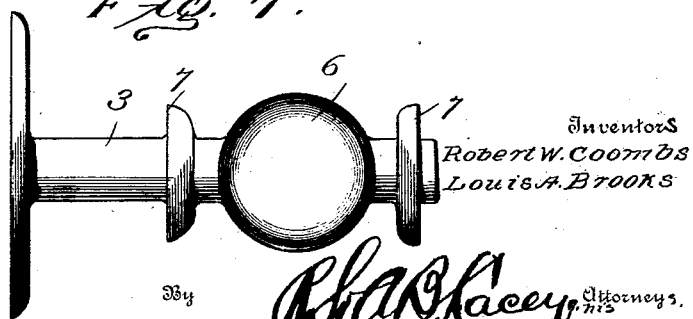

UNITED STATES PATENT OFFICE.

ROBERT W. COOMBS AND LOUIS A. BROOKS, OF LARIMORE, NORTH DAKOTA.

SELF-LUBRICATING AND DUST-PROOF BEARING FOR COLTER OR OTHER SHAFTS.

SPECIFICATION forming part of Letters Patent No. 664,724, dated December 25, 1900.

Application filed March 24, 1900. Serial No. 10,075. (No model.)

*To all whom it may concern:*

Be it known that we, ROBERT W. COOMBS and LOUIS A. BROOKS, citizens of the United States, residing at Larimore, in the county of Grand Forks and State of North Dakota, have invented certain new and useful Improvements in Self-Lubricating and Dust-Proof Bearings for Colter or other Shafts; and we do hereby declare the following to be a full, clear, and exact description of the invention, such as will enable others skilled in the art to which it appertains to make and use the same.

This invention relates to a self-lubricating and dust-proof bearing for plow-colter and other shafts, one object in view being to provide a construction of shaft-journal and box or bearing embodying simplicity and strength and adapted to prevent the entrance of dust and dirt and the escape of the oil or other lubricant used.

The invention further has for its object to provide a simple, strong, and durable construction of colter and carrying-yoke, the latter having improved means for connecting the sections of the bearing-box to obviate casual displacement thereof and maintain the coöperating parts in proper relation.

In the drawings hereto annexed and forming a part of this specification, Figure 1 is a rear perspective view of a plow-colter constructed in accordance with the invention. Fig. 2 is a vertical longitudinal section through the colter, axle, and bearing-boxes. Fig. 3 is a transverse section through the shaft and one of the bearing-boxes. Fig. 4 is a perspective view of the yoke. Fig. 5 shows an inner and an outer perspective view of one of the box-sections. Fig. 6 is a perspective view of a shaft-section. Fig. 7 is a sectional view showing a modification.

Like reference characters are employed in the following description and annexed drawings to designate corresponding parts throughout the several views.

1 represents a rolling plow-colter comprising a disk vertically disposed and adapted to run in advance of the plowshare in the usual way. This disk is mounted upon a shaft, which may be made of a single continuous piece of metal passed through the disk and suitably secured thereto, but is preferably composed of corresponding sections 2 and 3, provided at their inner ends with heads or annular flanges 5, which bear upon opposite sides of the disk and clamp the same between them, rivets or other suitable fastening devices being employed to hold the parts connected. By this construction the disk is reinforced and strengthened and a firmer and more stable connection between the shaft and disk secured.

Each shaft-section is provided at its outer end with a journal 6 and a dirt-excluding collar 7. The journal is formed by enlarging the outer end of the shaft-section and giving it the general form of a tuber or knob and, preferably, by making said enlargement of pear form, the base being at the outer extremity and the sides thence tapered inwardly and merging into the line of the body portion of the shaft-section at the base of the outer side of the collar 7. The collar is thus located at what may be called the "inner" end of the neck portions of the journal, and its outer side is curved or rounded on a bevel to diminish friction, while its inner side is straight or flat to form a right-angular shoulder or stop to effectually prevent the entrance of dirt, dust, and sand into the space between the journal and box and lodging in the sand-chamber. It is preferable to make the collar of the same diameter as the shaft; but it may be made slightly larger, if desired.

The shaft-journals are mounted to revolve in boxes 9, carried by the yoke 10. These boxes are of like formation, and each comprises top and bottom sections 11 and 12, said sections consisting of plates provided with ears or projections 13, having screw-threaded openings for passage of screw-bolts or other suitable fastening devices to secure them together and to the yoke. Any other construction of fastening means may, however, be employed. The central portions of the box sections or plates are pressed or swelled outwardly to form offstanding pear-shaped concavo-convex walls 14, forming in conjunction a bearing-chamber for the reception of the journal, the latter being designed to fit snugly and without binding and to turn easily therein. Near their inner ends the box-sections are also provided with offstanding concavo-convex walls 15, which are substantially semicircular in cross-section and coöperate in like manner to form a chamber to receive the collar 7. The outer rounded side of the collar conforms approximately to the curvature of the corresponding side of the wall 15, so as to rotate thereon; but the inner side thereof, owing to its flat form, stands outward from the inner side of the said wall 15, thereby forming a space or chamber 16, in which the dirt, dust, or sand which may find its way into the inner end of the bearing is retained and prevented by the collar from passing into the bearing-chamber proper. From the walls 15 the inner ends of the box sections or plates are formed with semicircular projections 17, adapted when the parts are assembled to register and snugly fit about the shaft and prevent, as far as possible, the entrance of dirt and other foreign substances between the box-sections. The wall 14 of the upper bearing-section is provided at the front with a screw-threaded oil-inlet 18, which is normally closed by a screw-plug 19. Through this inlet oil or other lubricating material may be supplied to the journal-chamber, and the action of the journal in revolving effects the feed of the same to the entire surface of the bearing, thus forming in effect a self-lubricating bearing. A packing-strip 20, of leather, rubber, or other equivalent material, is applied between the flat outer edges of the box-sections surrounding the bearing and dirt chamber and coöperates with the latter to exclude dirt and dust from the said bearing-chamber. By this means a practically dust-proof bearing is provided.

The arms 21 of the yoke 10 are forked at their lower free ends to provide arcuate straps 22, which straddle the inner reduced or tapered end portions of the walls 14 of the upper box-sections, and thereby act as stays to reinforce the same against strain, and these straps terminate in feet 23, which are secured to the boxes by the bolts uniting the sections of the latter to each other. The central portion of the yoke is provided, as usual, with an eye 24 for passage of a bolt or swivel connection to unite it to the beam of the plow.

In the modification shown in Fig. 7 the journal is substantially spherical in form and sand-collars are arranged upon each side thereof. This construction is designed to be used where the shaft extends through the bearing-boxes and it is necessary to make provision to exclude dust at both ends of the bearing. The changes required to adapt the boxes for use in connection with this form of journal will be readily understood.

It will also be understood that while the construction of shaft journal and bearing is primarily designed for use in connection with plow-colters we do not limit the application of the invention thereto, as the same may be advantageously employed in machine structures of various kinds. Hence changes in the form, proportion, and minor details of construction may be made within the scope of the invention without departing from the spirit or sacrificing any of the advantages thereof.

Having thus described the invention, what is claimed as new is—

1. In a journal-bearing for colter and other shafts, a shaft having an enlarged rounded journal and a sand-collar located adjacent thereto, in combination with a sectional box comprising coöperating parts having chambers for the reception of said journal and collar.

2. In a journal-bearing for colter and other shafts, a shaft having an enlarged tapered journal and a sand-collar located at or near the reduced end of the journal, in combination with a box comprising coöperating parts having matching concavo-convex portions forming chambers for said journal and collar.

3. In a journal-bearing for colter and other shafts, a shaft having a tuber or knob like journal and a sand-collar at or near the reduced end of the journal, and a box comprising coöperating top and bottom plates having outpressed concavo-convex walls forming chambers for said journal and collar.

4. In a journal-bearing for colter and other shafts, a shaft having a rounded journal tapering inwardly and a sand-collar located at or near the tapered end of the collar and having a curved outer side rounded on a bevel and a substantially straight inner side, combined with a box formed of top and bottom plates having corresponding concavo-convex walls forming chambers for said journal and collar, the journal-chamber corresponding in form thereto and the collar-chamber being of approximately semicircular form in cross-section to form a dirt-retaining space at the inner end thereof, substantially as described.

5. In a colter, the combination of a shaft having enlarged, inwardly-tapering journals and collars adjacent thereto, boxes having concavo-convex walls forming chambers for the reception of the journals and collars, and a yoke having forked ends straddling the concavo-convex walls.

6. In a colter, the combination of a shaft having a rounded journal and sand-collar at each end, boxes therefor having concavo-convex walls forming chambers for the journal and collar, and a yoke having forked ends fitting into the space between the concavo-convex walls of each box and secured, substantially as described.

In testimony whereof we affix our signatures in presence of two witnesses.

ROBERT W. COOMBS. [L. S.]
  LOUIS A. BROOKS. [L. S.]

Witnesses:
 C. W. McELROY,
 THOS. H. PUGH.